(12) United States Patent
Stroomer

(10) Patent No.: US 7,673,288 B1
(45) Date of Patent: Mar. 2, 2010

(54) BYPASSING EXECUTION OF A SOFTWARE TEST USING A FILE CACHE

(75) Inventor: Jeffrey D. Stroomer, Lafayette, CO (US)

(73) Assignee: XILINX, Inc., San Jose, CA (US)

( * ) Notice: Subject to any disclaimer, the term of this patent is extended or adjusted under 35 U.S.C. 154(b) by 1156 days.

(21) Appl. No.: 11/264,732

(22) Filed: Nov. 1, 2005

(51) Int. Cl.
- *G06F 9/44* (2006.01)
- *G06F 7/58* (2006.01)
- *G06F 9/45* (2006.01)
- *H04L 9/32* (2006.01)

(52) U.S. Cl. .................. 717/124; 717/127; 717/135; 703/14; 703/22; 713/171

(58) Field of Classification Search ......... 717/124–135; 711/163; 714/38; 716/4–6; 380/255; 703/14–16, 703/21, 22
See application file for complete search history.

(56) References Cited

U.S. PATENT DOCUMENTS

| | | | | |
|---|---|---|---|---|
| 5,633,813 A * | 5/1997 | Srinivasan | ................... | 703/14 |
| 5,673,387 A * | 9/1997 | Chen et al. | ................... | 714/38 |
| 6,167,545 A * | 12/2000 | Statovici et al. | ............. | 714/724 |
| 6,223,272 B1 * | 4/2001 | Coehlo et al. | ................... | 712/1 |
| 6,292,569 B1 * | 9/2001 | Shear et al. | ................. | 380/255 |
| 6,367,013 B1 * | 4/2002 | Bisbee et al. | ............... | 713/178 |
| 6,490,696 B1 * | 12/2002 | Wood et al. | .................... | 714/38 |
| 6,594,820 B1 * | 7/2003 | Ungar | ......................... | 717/124 |
| 6,816,952 B1 * | 11/2004 | Vartti et al. | .................. | 711/163 |
| 7,225,416 B1 * | 5/2007 | Pritchard et al. | ............... | 716/4 |
| 7,363,618 B2 * | 4/2008 | Pal et al. | ...................... | 717/131 |
| 2003/0204784 A1 * | 10/2003 | Jorapur | ........................ | 714/38 |
| 2004/0177332 A1 * | 9/2004 | Pandey et al. | .................. | 716/5 |
| 2005/0172267 A1 * | 8/2005 | Bergin | ......................... | 717/124 |
| 2005/0289355 A1 * | 12/2005 | Kitariev et al. | .............. | 713/182 |
| 2006/0047861 A1 * | 3/2006 | Hung et al. | .................... | 710/11 |

* cited by examiner

*Primary Examiner*—Lewis A Bullock, Jr.
*Assistant Examiner*—Carina Yun
(74) *Attorney, Agent, or Firm*—LeRoy D. Maunu

(57) ABSTRACT

A method is provided that speeds up software testing using abbreviation of software tests that skips the execution of a portion of the software test. Intermediate results are generated for one or more software tests, with each intermediate result corresponding to a software test, and a respective key is generated from each intermediate result. A determination is made whether the respective key for each intermediate result is stored in a file cache used for storing files under keys. Generation of a final result for the corresponding software test of each intermediate result is bypassed in response to the respective key being present in the file cache. A final result for the corresponding software test of each intermediate result is generated from the intermediate result in response to the respective key not being present in the file cache. The respective key is stored in the file cache in response to generation of each final result.

14 Claims, 5 Drawing Sheets

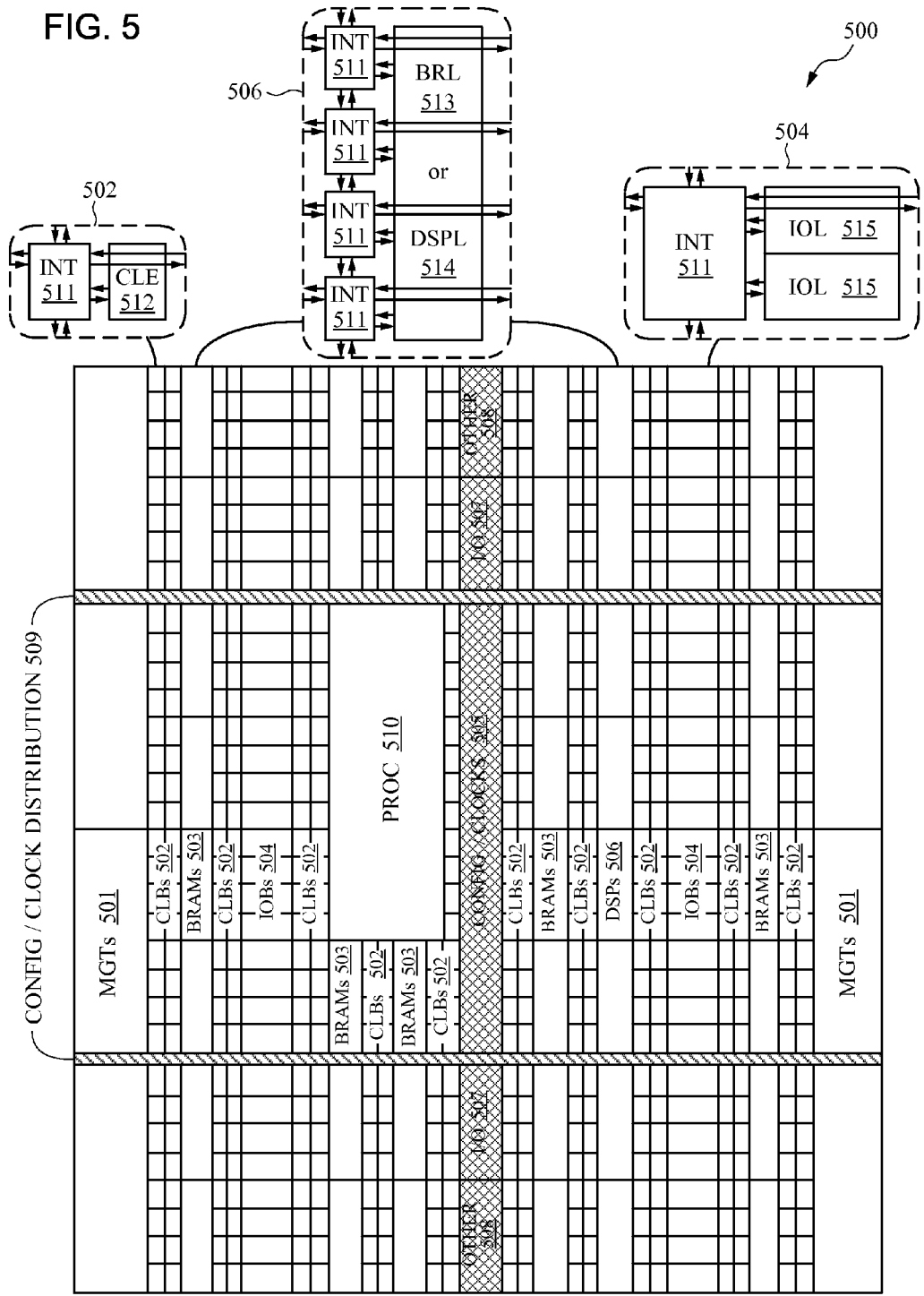

BYPASSING EXECUTION OF A SOFTWARE TEST USING A FILE CACHE

FIELD OF THE INVENTION

The present invention generally relates to speeding up software testing by using a file cache.

BACKGROUND

Exhaustive testing of software is generally not feasible, and therefore, test efforts tend to be directed to running tests most likely to uncover errors. It is often possible to save testing time by bypassing the remainder of a test when preliminary test results indicate that the balance of the test is guaranteed to succeed. For example, suppose T is a test, and the final outcome of T entirely depends on intermediate results produced by T. Suppose also that a run of test T succeeds. Then for a subsequent run of T for which the intermediate results match the intermediate results from the earlier successful run, the part of test T that follows the part producing the intermediate results can be bypassed because that remainder of the test may be guaranteed to succeed as well.

To illustrate bypassing a portion of a test in a more concrete example, suppose S is a software system that generates electronic designs, and assume T is a test for S. Test T consists of two main steps: first, running S to generate a design, and second, simulating the generated design. Test T succeeds if the simulation produces expected results. Simulations are usually quite slow, so it is useful to eliminate simulation testing if practical. Since the simulation results depend on nothing except for the design being simulated (assuming the same simulation stimuli), the results are guaranteed to be good if the design being simulated is known to be identical to the design for which simulation succeeded previously.

Tracking tests and intermediate and final test results may be time-consuming and potentially prone to errors. That is, tests may be so numerous, large, and complex that accurate identification of suitable portions of tests for bypass may be very difficult.

The present invention may address one or more of the above issues.

SUMMARY OF THE INVENTION

Various embodiments of the invention provide a processor-implemented method for software testing. Intermediate results are generated for one or more software tests, with each intermediate result corresponding to a software test. A respective key is generated from each intermediate result. Whether the respective key is stored in a file cache, which stores a plurality of files under a plurality of keys, is determined for each intermediate result. Generation of a final result for the corresponding software test of each intermediate result is bypassed in response to the respective key being present in the file cache. A final result for the corresponding software test of each intermediate result is generated from the intermediate result in response to the respective key not being present in the file cache. The respective key is stored in the file cache in response to generation of each final result.

Various other embodiments of the invention provide a system for execution of software testing. A generator generates intermediate results for at least one software test, with each intermediate result corresponding to a software test. A hash generator generates a respective key from each intermediate result. For each intermediate result, an executor bypasses generation of a final result of the corresponding software test responsive to the respective key being present in a file cache, which stores files under keys. The executor also generates a final result of the corresponding software test from each intermediate result responsive to the respective key not being present in the file cache, and stores the respective key in the file cache responsive to each final result.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 5 is a block diagram of a programmable logic device (PLD) that may implement an electronic circuit that is simulated in accordance with various embodiments of the invention.

DETAILED DESCRIPTION

Figure 1:
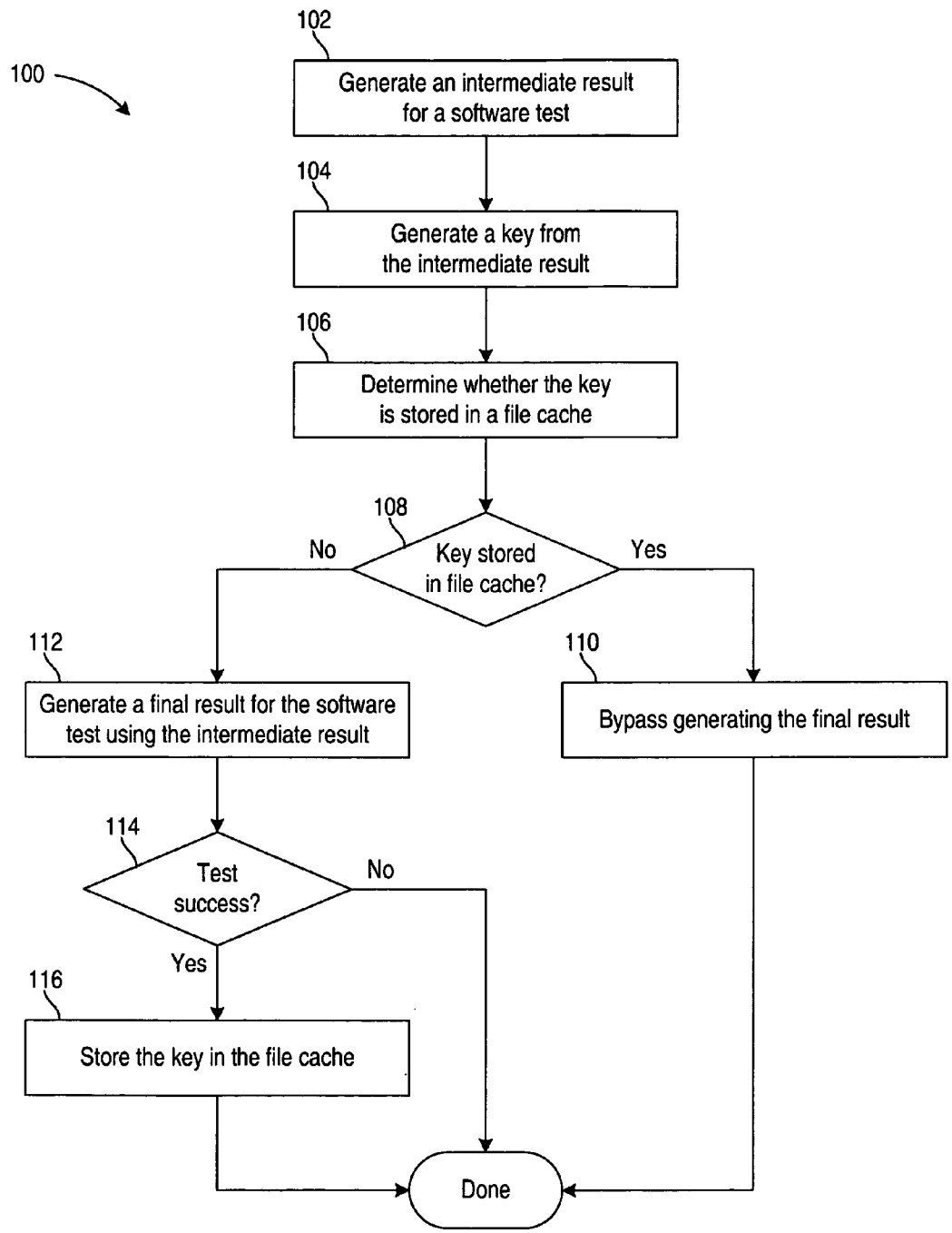
FIG. 1 is a flow diagram of a process for software testing in accordance with various embodiments of the invention.

Various embodiments of the invention utilize a software mechanism known as a "file cache". A file cache is generally used to store and retrieve files, and is organized as a collection of key/value pairs. Each value is a file or a set of files. Each key is an object that identifies the corresponding file or files. Usually keys are strings or hash values. A "general-purpose" file cache is a file cache that is able to store arbitrary kinds and numbers of files.

During verification of a software system using a test suite of individual software tests, certain of these software tests may be abbreviated using various embodiments of the invention. To "abbreviate" a software test is to skip executing a portion of the test. For example, a first version of the software system may be modified during debugging to create a second version of the software system that fixes a defect discovered by a failing software test in the test suite. Various embodiments of the invention may skip re-executing a portion of a software test that has completed successfully on the first version of the software system because the skipped portion almost certainly would complete successfully on the second version of the software system. For certain software systems, execution of all of the software tests in the suite may take days or weeks. For such a software system, efficiency of verification may be increased by abbreviating software tests that are likely to pass again, because a passing test may not help identify any remaining defects in the software system. Instead, the remaining defects in the software system may be more quickly discovered by re-executing failing software tests and also executing software tests that have not been previously executed.

A previously passing software test could become a failing software test after fixing a defect because the fix may introduce another defect or the fix may perturb the behavior of the software system such that a latent defect is exposed by the previously passing test. Thus, verification of a software system is not generally completed until every software test in the suite is verified to complete successfully on a final version of the software system. It will be appreciated that the skipping of passing software tests may be periodically, intermittently, or occasionally suspended, such that previously passing tests are executed again. Despite the possibility that a previously passing test may become a failing test, the overall efficiency of the verification of a software system has been found to be improved by generally abbreviating previously passing software tests.

In various embodiments of the invention, the execution of a software test may be split into generation of an intermediate result and generation of a final result from the intermediate result. For a software test completing with a successful final result, a single key may be generated from the intermediate result. The key may be a checksum or hash of the intermediate result. For example, the intermediate result may be the input files that are generated for a simulation of an electronic circuit, and the key may be an MD5 or SHA cryptographic hash formed by processing all of the input files for the simulation. In one embodiment, a single key of fixed size is generated regardless of the number, kinds, or sizes of objects constituting the intermediate result.

For a software test that completes with a successful final result, the single key may be saved as a key in a file cache to identify the passing software test. The particular file or files in the file cache associated with this key are unimportant. In one embodiment, one empty or nonempty file may be associated with the key. In another embodiment, an empty or nonempty collection of empty or nonempty files may be associated with the key. The unifying idea is that the key derived from a software test's intermediate result becomes a key stored in the file cache. It will be appreciated that such a file cache may contain keys and files other than ones derived from testing results.

After the generation of an intermediate result for each software test, a key may be generated from the intermediate result and this key may be compared with the keys saved in the file cache to identify whether the software test has already generated a passing final result. For each software test having an intermediate result with a key that is already saved in the file cache, the generation of a final result for the software test may be bypassed because the software test has previously generated a successful final result. In certain embodiments, the generation of the intermediate result for a software test may be relatively fast as compared to the generation of the final result. Thus, the bypassing of generating the final result for previously passing software tests may significantly improve the efficiency of the verification of the software system.

In certain embodiments, the key may be a 128-bit value for a key generated from the MD5 cryptographic hash function. In certain other embodiments, the key may be a 160-bit key from a cryptographic hash function in the Secure Hash Algorithm (SHA) family. It will be appreciated that other sizes of keys and other methods for generating keys may be used. Thus, a fixed small amount of storage may be needed to identify a software test having already generated a successful final result and this storage may be independent of the sizes, kinds, and numbers of objects constituting the intermediate and final results. In one embodiment the intermediate result is not saved in the file cache. This is particularly advantageous when the numbers and/or sizes of the objects constituting the intermediate result are large. In another embodiment, the intermediate result may be stored in the file cache as a file or set of files. The process for verifying a software system may also automatically save the key in the file cache for software tests having successful final results, and also automatically check the key and bypass of the generation of a final result for a key that is already stored in the file cache.

Because a file cache may be readily shared among multiple users, such as personnel having respective computers connected to a shared network (e.g., a corporate intranet or the Internet), the saving of a key in the file cache and the checking for the presence of a key in the file cache may be automatically shared between users. Such sharing may be expedited because a file cache may be included as a component of the software environment in which the personnel operate. As a consequence, one user's test may be abbreviated because the same test was previously completed successfully by another user.

Certain software environments include a file cache for purposes that may be unrelated to software testing. For example, a software application, which is generally available to the employees in an organization, may contain a general-purpose file cache and this file cache may be available for use by other software applications. In one embodiment of this invention, the general-purpose file cache may be used to abbreviate software tests despite the fact that the file cache was not intended for such usage. In addition, the file cache may be simultaneously used for unrelated activities.

FIG. 1 is a flow diagram of a process for software testing in accordance with various embodiments of the invention. For each test in a suite of software tests, the software testing generates an intermediate result, generates a key from the intermediate result, and either generates a final result or bypasses generating a final result depending on the presence or absence of the key in a file cache.

At step 102, an intermediate result, which may include multiple files or software objects, is generated for a software test. In certain embodiments, a test case generator automatically generates the intermediate result from parameters indicating the extent of the test suite. A test case generator may sometimes generate the same intermediate result multiple times. At step 104, a single key is generated from the intermediate result. At step 106, the presence or absence of the key in a file cache is determined. If the key is stored in the file cache, process 100 proceeds from decision 108 to step 110, and otherwise process 100 proceeds from decision 108 to step 112.

At step 112, the final result is generated from the intermediate result for the software test. At decision 114, the success or failure of the final result is checked. In certain embodiments, completion of the generation of the final result indicates success and the lack of completed generation of the final result indicates failure. In certain other embodiments, success or failure of the software test is a component included in the final result. For a successful software test, process 100 proceeds to step 116, and otherwise process 100 completes for the software test. At step 116, the key generated at step 104 is stored in the file cache for the successful software test, and process 100 completes.

At step 110, the generation of the final result is bypassed and process 100 completes for a software test that previously completed successfully and consequently stores the key (from step 104) in the file cache at step 116. The software test may have previously completed successfully because a test case generator generated the same test twice. While the possibility exists that there is a collision of differing intermediate results for two software tests that generate the same key, usage of a high-quality key generator, such as the MD5 or SHA cryptographic hash, makes such a collision almost impossible in actual practice. The bypassing of the generation of the final result for a previously successful software test may improve the efficiency of the software testing.

Figure 2:
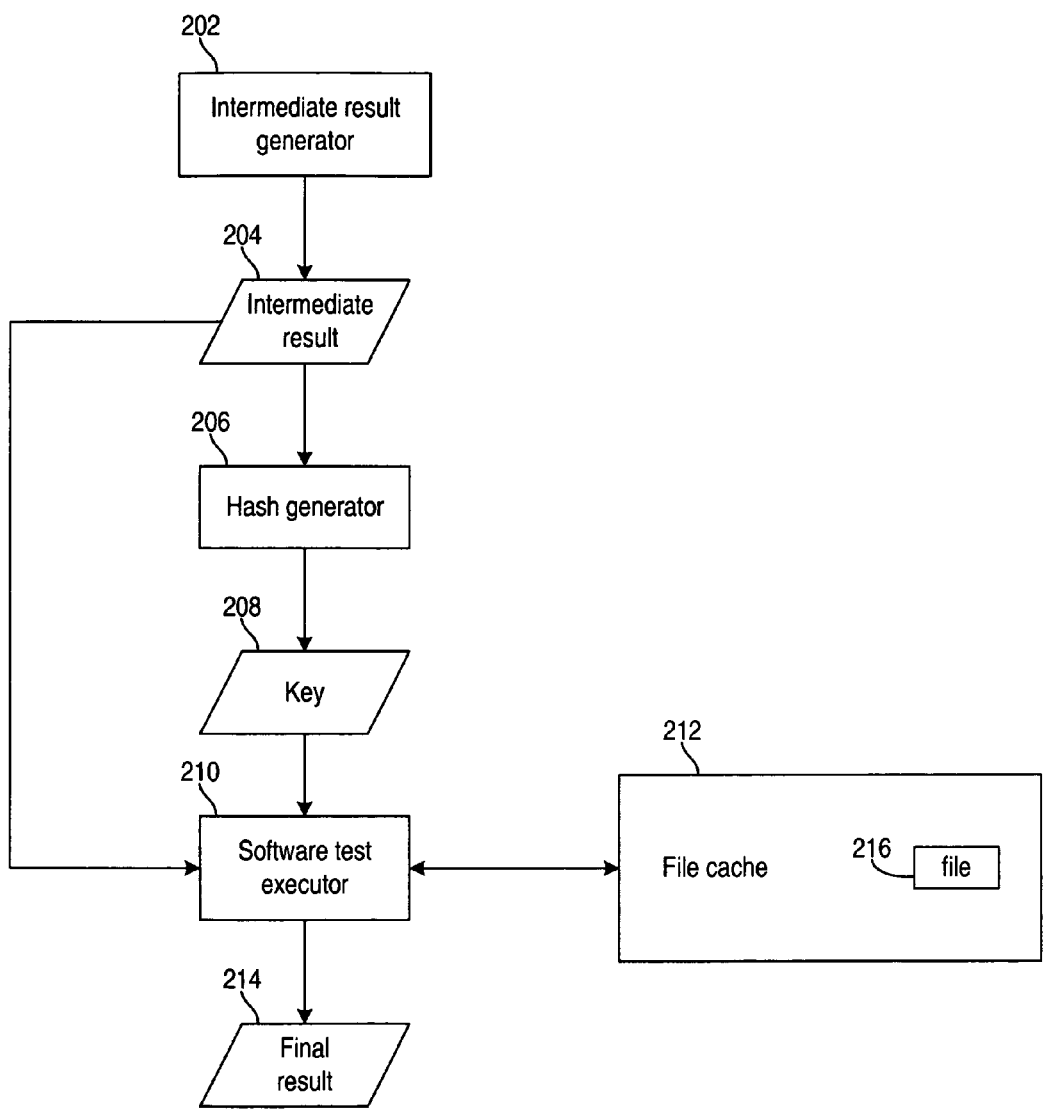
FIG. 2 is a block diagram of a system for execution of software testing in accordance with various embodiments of the invention.

FIG. 2 is a block diagram of a system for execution of software testing in accordance with various embodiments of the invention. A generator 202 generates an intermediate result 204 for a software test. A hash generator 206 generates a key 208 from the intermediate result 204. An executor 210 checks whether the key 208 is stored in a file cache 212. If the key 208 is not stored in the file cache 212, the executor 210 generates a final result 214 from the intermediate result 204, and otherwise the executor 210 bypasses the generation of the final result 214.

In certain embodiments, when the generation of the final result 214 is completed, the executor 210 stores the key 208 in the file cache 212. In certain other embodiments, when the generation of the final result 214 is completed and the final result 214 indicates success of the software test, the executor 210 stores the key 208 in the file cache 212.

In various embodiments, the key 208 may be stored in the file cache 212 by storing an empty file 216 in the file cache 212 under the key 208. In various other embodiments, the key 208 may be stored in the file cache 212 by storing a non-empty file 216 in the file cache 212 under the key 208. This non-empty file 216 may contain identifying information including one or more of a name of a user directing the software test (including generating the final result 214), a name of a computer performing the software test, a time and date for the software test, and a version number of at least one software module of the executor 210 that executes the software test. This identifying information may be useful for detecting and/or correcting corruption of the file cache 212. The file 216 may have a name that includes the key 208. Checking for the presence of a key 208 in the file cache 212 may include comparing the key 208 with the name of a file 216 in the file cache 212. Checking for the presence of a key 208 in the file cache 212 may also include attempting to retrieve a file 216 in the file cache 212 having a name corresponding to the key 208.

Figure 3:
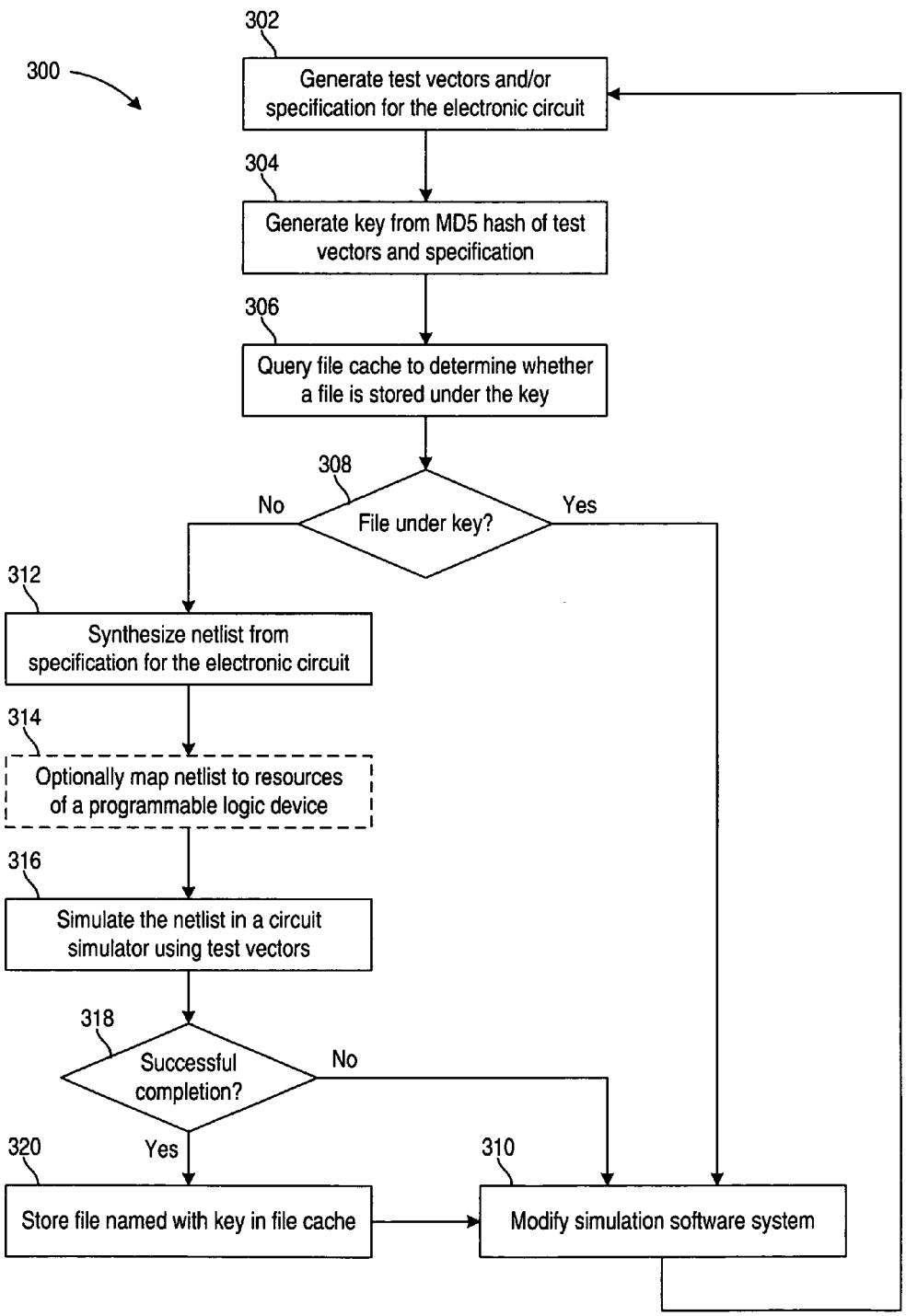
FIG. 3 is a flow diagram of a process for simulating an electronic circuit in accordance with various embodiments of the invention.

FIG. 3 is a flow diagram of a process 300 for simulating an electronic circuit in accordance with various embodiments of the invention. The simulation of an electronic circuit may be a software test that generates an input test vector for the electronic circuit and/or generates a specification in a hardware description language (HDL) for the electronic circuit, and simulates an HDL specification using an input test vector. It will be appreciated that simulation is but one example application in which testing may be abbreviated, and that the various approaches for abbreviating tests may be applied to many other applications.

At step 302, an intermediate result may be generated including test vectors and/or a specification for an electronic circuit. The test vectors may control the stimulus for the inputs of an electronic circuit during simulation. A specification of an electronic circuit may also be generated. For example, the software testing using simulation of a programmable logic device (PLD) may generate various electronic circuits to test the PLD that implements these electronic circuits. Input test vector may also be generated for each electronic circuit or fixed test vectors may instead be used for these electronic circuits. For the software testing using simulation of a non-programmable integrated circuit, for example, input test vector may be generated for each software test and the specification of the electronic circuit may be a fixed specification. It will be appreciated that the intermediate result generated at step 302 may include other input files for the simulation of the electronic circuit.

At step 304, a cryptographic hash, such as the MD5 or SHA cryptographic hash, of the intermediate result, including the test vectors and/or the specification of the electronic circuit, is generated to produce a key. The input files of the intermediate result may be supplied to the cryptographic hash to produce a 128-bit (or larger) key that, in practice, uniquely identifies the intermediate result. The input files of the intermediate result may include any file or software object of the software system being used for simulation. For example, the software system may include a script that controls the process of executing the simulation of the electronic circuit, and such a script may included in the intermediate result.

At step 306, a file cache is queried to determine whether the file cache contains the key of interest. The file cache responds to the key query by indicating whether or not the key is present. In another embodiment, the file cache is queried by attempting to retrieve a file or files that are stored under the key. If any file or files have previously been stored in the file cache under the key, the file cache returns the file or files; otherwise, the file cache indicates the retrieval attempt is unsuccessful. Decision 308 checks the results from the query or retrieval attempt at step 306. For a successful retrieval of one or more files, process 300 may proceed to step 310, and for an unsuccessful retrieval attempt, process 300 proceeds to step 312.

At step 312, a netlist is synthesized from the HDL specification of the electronic circuit. For a software test that is a simulation of a PLD, the netlist may be mapped to the programmable logic and routing resources of the PLD at step 314. At step 316, the netlist of the electronic circuit is simulated in a circuit simulator using the stimulus from the test vectors. The test vectors, for example, may include assertions of the expected behavior of the electronic circuit, such as assertions of the expected values observed at the outputs of the electronic circuit. The violation of any assertion may indicate the simulation completes with an error indicating an unsuccessful simulation. Completion of the simulation without violating an assertion and without triggering any other error detection mechanism included in the software system may indicate successful completion of the simulation.

Decision 318 checks the completion status for the simulation. For a successful completion, process 300 proceeds to step 320; otherwise, process 300 proceeds to step 310. At step 320, the key generated at step 304 is stored in the file cache by storing in the file cache a file having a name including the key.

At step 310, the simulation system may be modified to fix a defect in the simulation system used to simulate the electronic circuit. The defect may be in an HDL specification of the electronic circuit; however, the defect may also be in software modules of the simulation system that are used to generate simulation input. For example, the generator of the test vectors may have a defect that affects test of a particular feature of the electronic circuit. After the defect is fixed in this generator of the test vectors, all the previously executed software tests may be re-executed, but only the software tests that exercise this feature of the electronic circuit may have modified test vectors. Thus, while the intermediate results for all software tests may be generated again, the only software tests that are simulated again are the software tests that have an intermediate result including modified test vectors. It will be appreciated that process 300 may complete when the simulation software system no longer needs modification at step 310.

A particular simulation software system may include unpredictable variations. For example, a generator of a specification of an electronic circuit may generate an input port list for a sub-circuit that may non-deterministically vary the order of the input ports in this input port list. A distinct key may be generated from the intermediate results that include each variation of the specification of the electronic circuit, and a separate simulation may be executed to generate the final results for each variation. Thus, another key for another intermediate result for a particular software test may already be stored in the file cache. However, barring other changes in the intermediate results, each variation will only be simulated once even though certain of the variations are generated multiple times.

Figure 4:
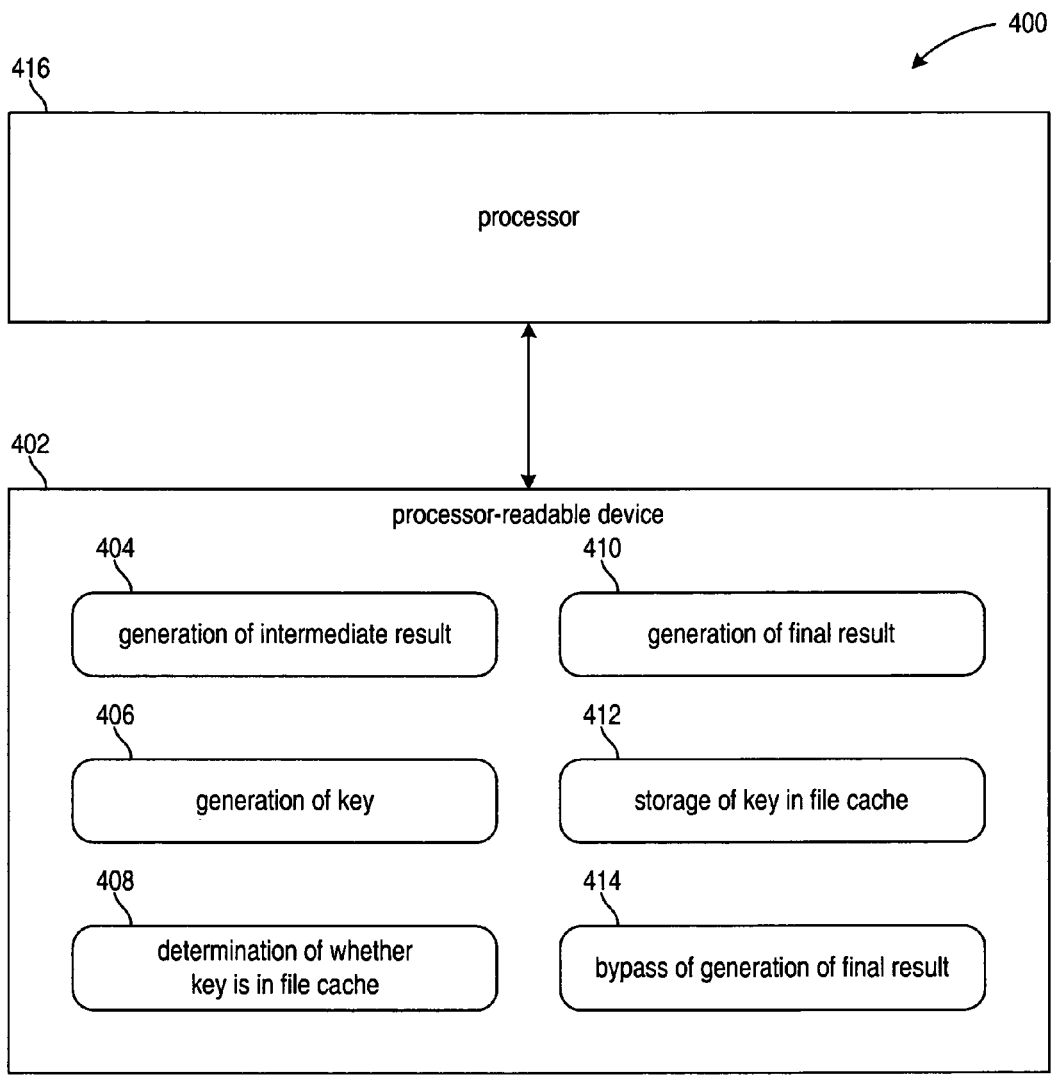
FIG. 4 is a block diagram of a system for software testing in accordance with various embodiments of the invention.

FIG. 4 is a block diagram of a system 400 for software testing in accordance with various embodiments of the invention. The processor-readable device 402 may be a program storage medium, including various modules 404 through 414 for software testing. The modules 404 through 414 may be read from processor-readable device 402 by processor 416 and instructions in each module may be executed by processor 416.

Execution of the instructions of module 404 through 414 by processor 416 causes the processor 416 to perform the designated operations. Execution of the instructions of module 404 causes processor 416 to generate an intermediate result for a software test and execution of the instructions of module 406 causes processor 416 to generate a key from the intermediate result. With the instructions of module 408 the processor 416 determines whether the key is stored in a file cache. The instructions of module 410 cause processor 416 to generate a final result for the software test in response to the key not being stored in the file cache, and execution of the instructions of module 414 causes processor 416 to bypass generation of the final result in response to the key being stored in the file cache. The processor 416, in executing the instructions of module 410, stores the key in the file cache in response to successful completion of the generation of the final result.

FIG. 5 is a block diagram of a programmable logic device (PLD) that may implement an electronic circuit that is simulated in accordance with various embodiments of the invention. Certain PLDs, such as advanced FPGAs, can include several different types of programmable tiles in the array. FIG. 5 illustrates an FPGA architecture 500 that includes a large number of different programmable tiles of programmable logic and routing resources including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for software testing. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for software testing, comprising:
   generating a plurality of intermediate results for at least one software test, wherein each intermediate result corresponds to one of the at least one software test;
   for each intermediate result, generating a respective key from the intermediate result;
   wherein the generating the respective key from the intermediate result includes generating a single key of a fixed size from a hash function of the intermediate result;
   for each intermediate result, determining whether the respective key is stored in a file cache, wherein the file cache stores a plurality of files under a plurality of keys;

for each intermediate result, bypassing generating a final result for the corresponding software test from the intermediate result in response to the respective key being present in the file cache;

for each intermediate result, generating a final result for the corresponding software test from the intermediate result in response to the respective key not being present in the file cache; and for each final result, storing the respective key and not storing the intermediate result in the file cache in response to the generating the final result, wherein the storing the respective key in the file cache in response to the generating the final result includes storing the respective key in the file cache in response to the final result indicating a successful test;

wherein the storing the respective key in the file cache includes storing a file in the file cache under the respective key, and the file is one of an empty file or contains at least one of: a name of a user directing the generating the final result, a name of a computer performing the generating the final result, a time and date of the generating the final result, and a version number of at least one software module performing the generating the final result.

2. The method of claim 1, wherein the generating the plurality of intermediate results includes, for each intermediate result, generating simulation input that includes a test-vector for the corresponding software test that is a simulation of an electronic circuit.

3. The method of claim 2, wherein the generating simulation input further includes generating a specification of the electronic circuit in a hardware description language.

4. The method of claim 1, wherein the hash function is one of an MD5 cryptographic hash function and a Secure Hash Algorithm (SHA) cryptographic hash function.

5. The method of claim 1, wherein the determining whether the respective key is stored in the file cache includes attempting to retrieve at least one file from the file cache under the respective key.

6. The method of claim 1, wherein the generating the final result for the corresponding software test includes synthesizing a netlist from a specification of an electronic circuit in a hardware description language and simulating the netlist in a circuit simulator.

7. The method of claim 6, wherein the generating the final result for the corresponding software test further includes mapping the netlist to programmable logic and routing resources of a programmable logic device.

8. The method of claim 6, wherein the simulating the netlist in the circuit simulator includes simulating the netlist in the circuit simulator using a test-vector for the corresponding software test of the electronic circuit.

9. The method of claim 1, wherein the storing of the empty file includes storing the empty file, which has a name that includes the respective key, in the file cache.

10. The method of claim 1 further comprising modifying a software system that is tested by the at least one software test and repeating the determining, the bypassing, the generating the final result, and the storing following the modifying of the software system.

11. A system for execution of software testing, comprising:
a processor;
a file cache coupled to the processor and adapted to store a plurality of files under a plurality of keys; and
a storage device coupled to the processor and configured with modules of instructions that are executable by the processor for performing operations including:

generating a plurality of intermediate results for at least one software test, wherein each intermediate result corresponds to one of the at least one software test;

generating a respective key from the intermediate result;

wherein the generating the respective key from the intermediate result includes generating a single key of a fixed size from a hash function of the intermediate result; and bypassing generating a final result of the corresponding software test for each intermediate result responsive to the respective key being present in the file cache, generating a final result of the corresponding software test from each intermediate result responsive to the respective key not being present in the file cache, and storing the respective key and not storing the intermediate result in the file cache responsive to each final result, wherein the storing the respective key in the file cache responsive to each final result includes storing the respective key in the file cache in response the final result indicating a successful test, wherein the storing the respective key in the file cache includes storing a file in the file cache under the respective key, and the file is one of an empty file or contains at least one of: a name of a user directing the generating the final result, a name of a computer performing the generating the final result, a time and date of the generating the final result, and a version number of at least one software module performing the generating the final result.

12. The system of claim 11, wherein the at least one software test is a simulation of an electronic circuit.

13. The system of claim 12, wherein the operations further include generating each intermediate result that includes at least one of a specification of the electronic circuit in a hardware description language and a test-vector for the simulation of the electronic circuit.

14. A program storage medium, comprising:
a processor-readable device configured with instructions, wherein execution of the instructions by one or more processors causes the one or more processors to perform operations including, generating a plurality of intermediate results for at least one software test, each intermediate result corresponding to one of the at least one software test, for each intermediate result, generating a respective key from the intermediate result, wherein the generating the respective key from the intermediate result includes generating a single key of a fixed size from a hash function of the intermediate result, for each intermediate result, determining whether the respective key is stored in a file cache that stores a plurality of files under a plurality of keys, for each intermediate result, bypassing generating a final result for the corresponding software test from the intermediate result in response to the respective key being present in the file cache, for each intermediate result, generating a final result for the corresponding software test from the intermediate result in response to the respective key not being present in the file cache, and for each final result, storing the respective key and not storing the intermediate result in the file cache in response to the final result, wherein the storing the respective key in the file cache in response to the final result includes storing the respective key in the file cache in response to the final result indicating a successful tests wherein the storing the respective key in the file cache includes storing a file in the file cache under the respective key, and the file is one of an empty file or contains at least one of: a name of a user directing the generating the final result, a name of a computer performing the generating the final result, a time and date of the generating the final result, and a version number of at least one software module performing the generating the final result.

* * * * *